United States Patent
Wu

(10) Patent No.: US 6,185,821 B1
(45) Date of Patent: Feb. 13, 2001

(54) PRACTICAL FORGED FLANGE-TYPE BALL VALVE FABRICATION METHOD

(76) Inventor: Lei-Jui Wu, No. 13, Fang Yuan Hsiang, Hou Liao Tsun, Kung Chu 4 Road, Chang Hua Hsien (TW)

( * ) Notice: Under 35 U.S.C. 154(b), the term of this patent shall be extended for 0 days.

(21) Appl. No.: 09/263,193

(22) Filed: Mar. 5, 1999

(30) Foreign Application Priority Data

Nov. 30, 1998 (TW) .................................. 87119943

(51) Int. Cl.$^7$ ................................................... B23P 15/00
(52) U.S. Cl. ........................................................ 29/890.129
(58) Field of Search ...................... 29/888.45, 888.451; 228/114.5, 125

(56) References Cited

U.S. PATENT DOCUMENTS 3,841,601 * 10/1974 Grove et al. .
3,869,108 * 3/1975 Graham .
4,512,360 * 4/1985 Chronister .

* cited by examiner

Primary Examiner—I Cuda
(74) Attorney, Agent, or Firm—Dougherty & Troxell

(57) ABSTRACT

A method for forging a one-piece or two piece flange-type ball valve, including forging the left and right primary elements, the process including the direct forging of the water inlet seat and the ball valve seat for a one-piece flange-type ball valve, the forging of the water inlet seat, the ball valve seat, the position limiter seat and the water outlet seat. The fabrication of all the center through-holes and ball valve chamber are carried out in a single process without requiring the machining of the interior sections. Friction welding methods are used to weld the water inlet seat to the ball valve seat and the position limiter seat to the water outlet seat as if they were fabricated entirely by forging. The friction welding beads built-up along the mated welding surfaces inside the center through-hole and exterior are then removed to achieve a smooth finish and enable the valve to have a seamless appearance as though constructed of a single unit of material.

2 Claims, 11 Drawing Sheets

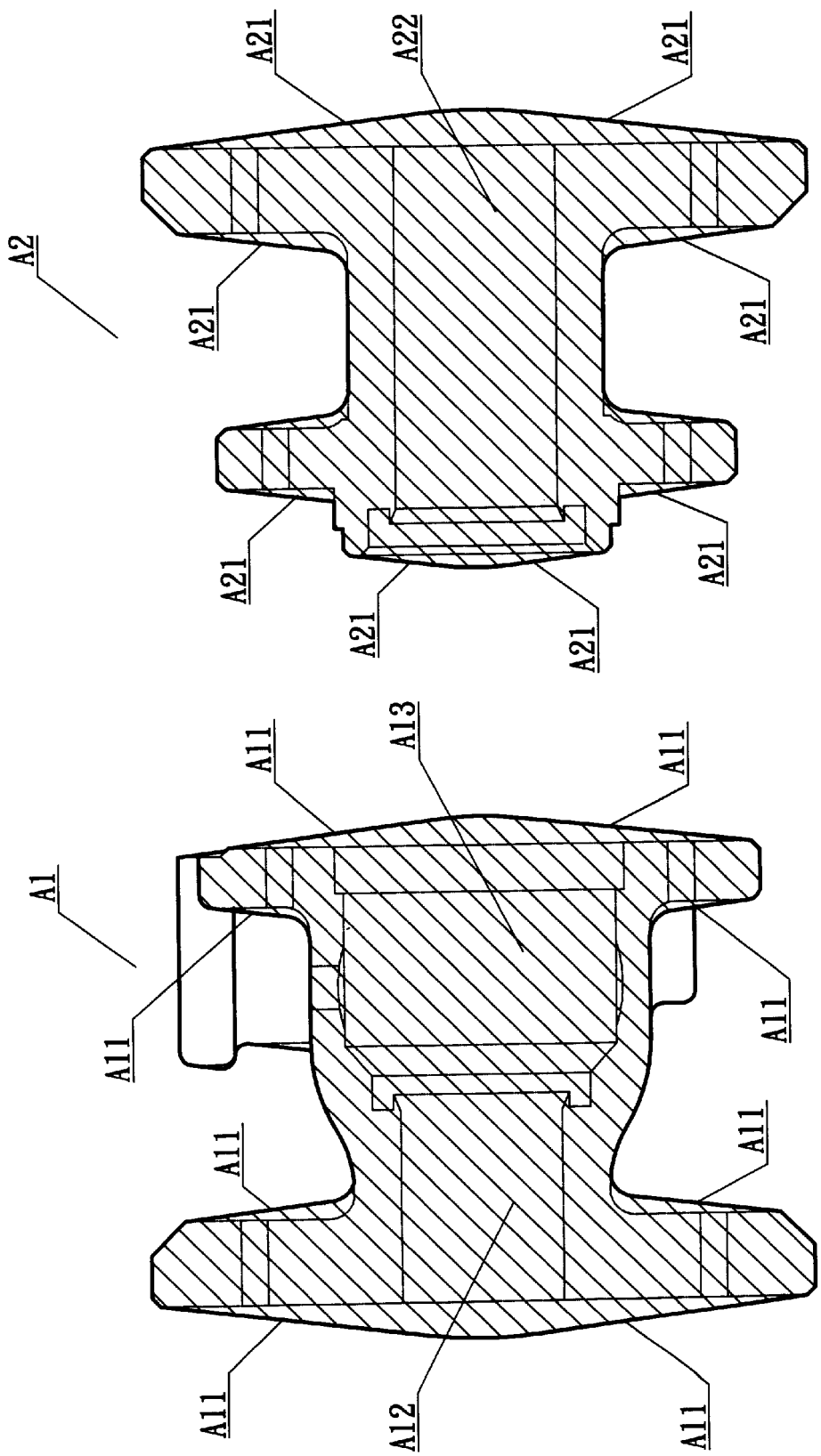
FIG. 1-A
PRIOR ART
FIG. 1-B
PRIOR ART

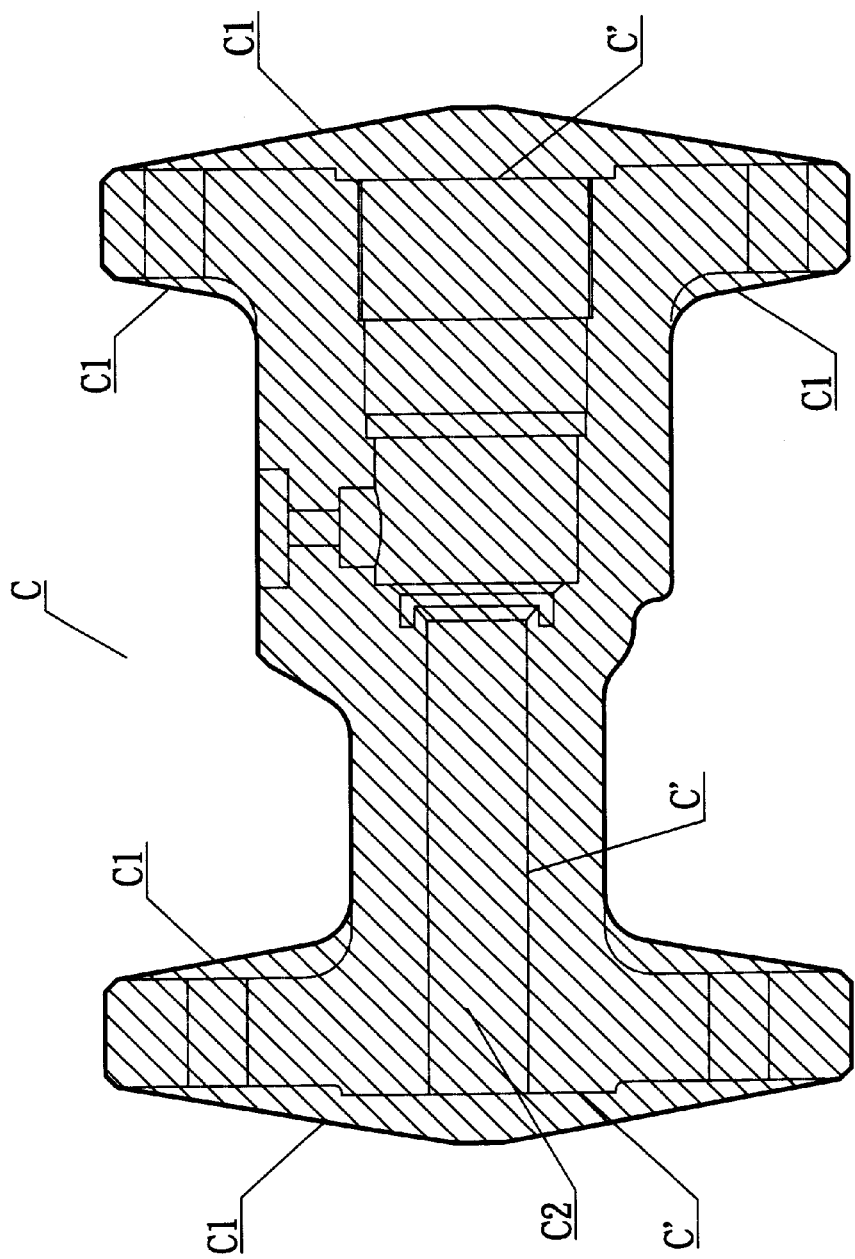
FIG. 1-C
PRIOR ART

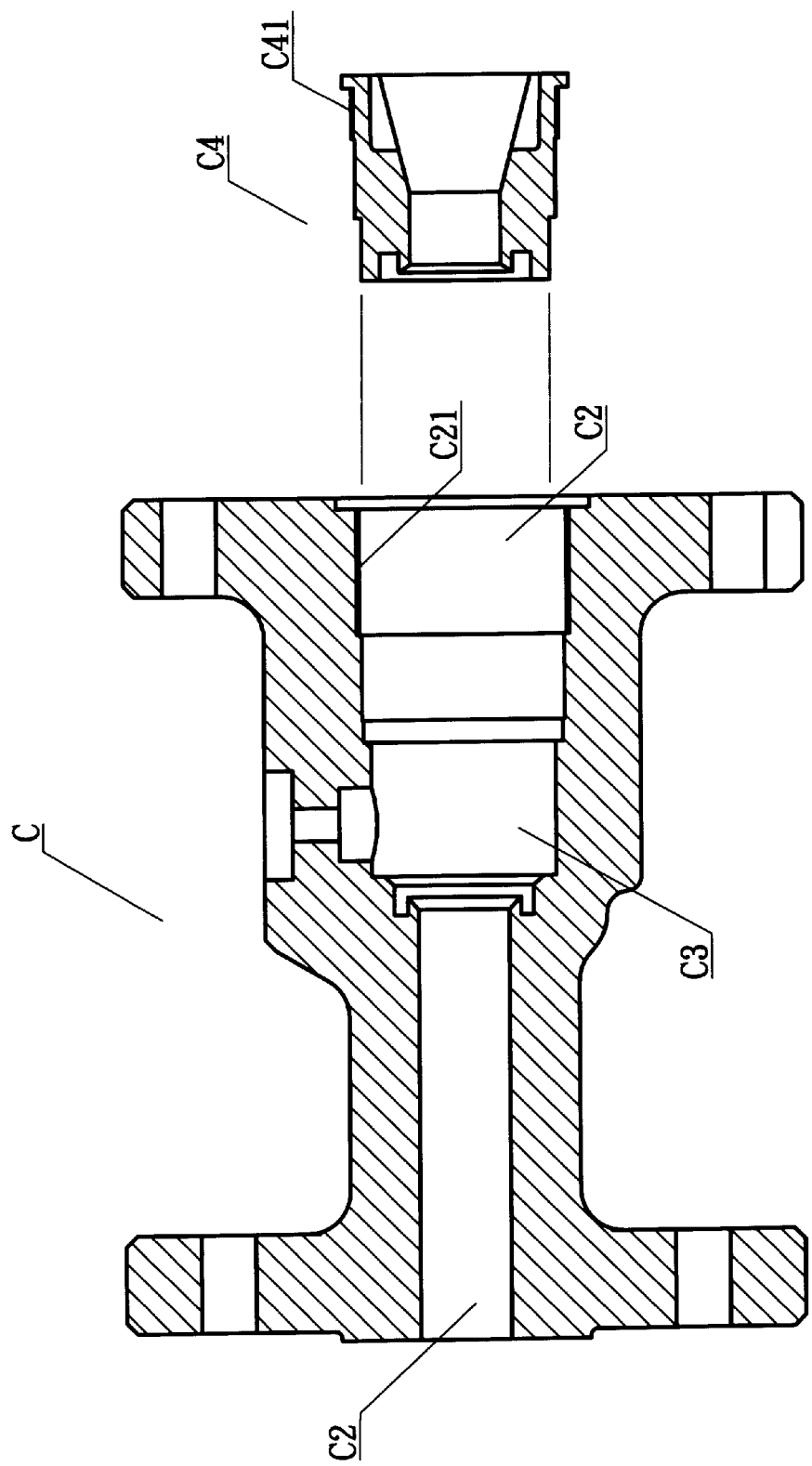
FIG. 1-D
PRIOR ART

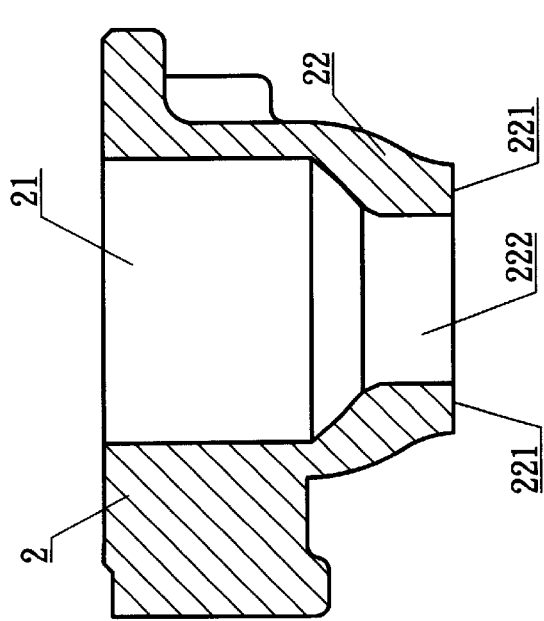
FIG. 2-C
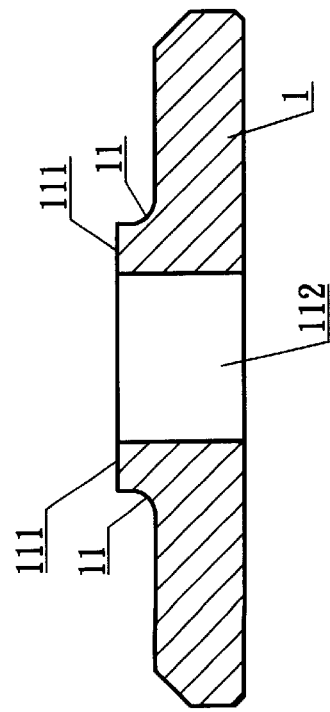
FIG. 2-D
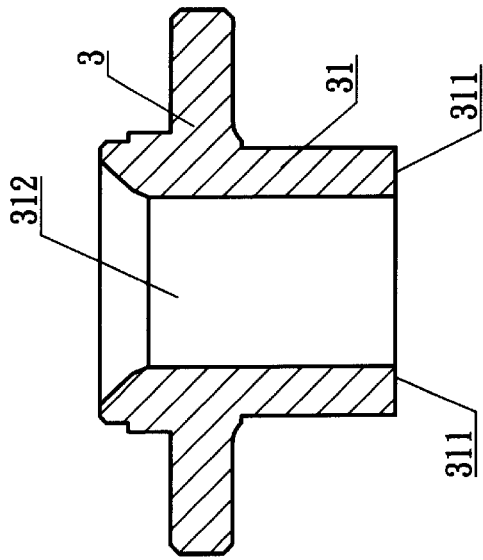
FIG. 2-B
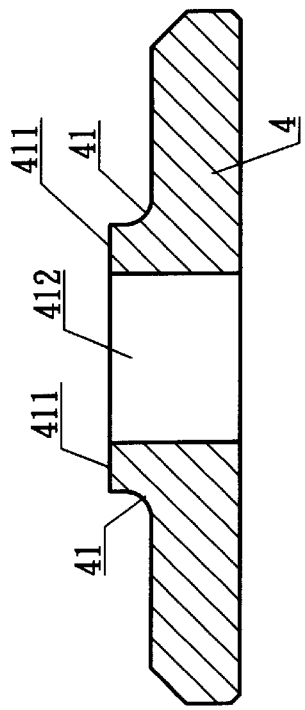
FIG. 2-A

PRACTICAL FORGED FLANGE-TYPE BALL VALVE FABRICATION METHOD

BACKGROUND OF THE INVENTION

1) Field of the Invention

The invention herein relates to a practical forged flange-type ball valve fabrication method that references blueprints of conventional flange-type valves to determine the appropriate position at the neck sections to delineate the separation needed to initially forge the water inlet seat and the ball valve seat of a one-piece flange-type ball valve or to initially forge the water inlet seat, the ball valve seat, the position limiter seat, and the water outlet seat of a two-piece flange-type ball valve. Then, friction welding is utilized to unite the welding surfaces of the water inlet seat and the ball valve seat into a structurally unitary one-piece flange-type valve or, in the case of the two-piece flange-type valve, the water inlet seat is welded to the water inlet seat and the position limiter seat is welded to the water outlet seat to form the left and right primary elements, of which all the center through-holes in the said forged components have already been formed in the same fabrication process to save material costs, shorten fabrication time, and reduce the detect rate.

2) Description of the Prior Art

Nearly all conventional metal ball valves are fabricated into shape by casting techniques because the left and right primary elements can be cast as a single physical entity and, furthermore, most of the interior and exterior features of the said initial blanks are already formed after being cast into shape and only require the finishing and drilling of various sections to complete the valve. However, cavitation readily occurs during the casting process and to lessen the fine surface pitting resulting from the said cavitation, the initial blanks are given additional thickness and then the actual thickness required is achieved by interior and exterior finishing. While this reduces fine pitting, the material removed constitutes an enormous waste and, furthermore, the complete elimination of the said pitting is not possible. As a result, defect rates tend to increase and defective products that are marketed may leak. Soldering or welding during maintenance could unavoidably result in explosions or fires, which are common disasters often observed.

Due to the said shortcomings of ball valves that are fabricated by casting, the industry expected to avoid pitting flaws by forging the valve blocks. Referring to FIGS. 1A and 1B, the initial blank of a forged two-piece flange-type valve of typical manufacture achieved the objective of single-entity shaping but still utilizes horizontal forging technology to forge the left and right primary elements A1 and A2. Because of the limitations on easily opening the dies after forming, a die removal angle had to be included inside the die which left a vertically oriented border on the left and right primary elements A1 and A2 that was manifested in the die release angles A11 and A21 that facilitated the opening of the die and, furthermore, the required center through-holes A12 and A22 as well as the ball valve chamber A13 of the left and right primary elements A1 and A2 could not be formed at the same time. The left and right primary elements A1 and A2 were solid blanks that still required shaping to become a ball valve, for example, the area indicated by the invisible line in the left and right primary elements A1 and A2 must be removed and, therefore, additional material has to be utilized in the said shape and forging must be followed by several stages of difficult finishing, which involves the waste of material. As such, although forging was expected to solve the shortcomings of casting such as high material and finishing costs, the cost remained high, the product did not impress users and could not be successfully promoted to consumers because improvement was still necessary.

Furthermore, referring to FIG. 1C, the one-piece flange-type ball valve C is forged as a single structural entity, but is still in a solid state. The die removal angle C1 is unavoidable and, furthermore, the interior center through-hole C2 and the ball valve chamber C3 must be machined out, which requires the removal of the sections indicated by the invisible line C1. Referring to FIG. 1D, to position the ball valve D in the ball valve chamber C3, the external threads C41 of the plug C4 must be screwed to the internal threads C21 along the right side of the center through-hole C2 so the plug C4 can be brought against the curvature of the ball valve. The plug C4 is indispensable in the structure of the one-piece flange-type ball valve and since the exterior shaping and finishing of the plug C4 is easy to complete, the inventor will continue utilizing this aspect of the structure. However, the internal finishing of the unitarily forged conventional one-piece flange-type ball valve involves a high degree of difficulty, which increases the finishing time, wastes material, and is essentially impractical.

Therefore, in view of the said shortcomings, the inventor of the invention herein addressed the said drawbacks by conducting research based on many years of production experience with efforts finally culminated in the research and development of the invention herein which is hereby submitted in application for the granting of the commensurate patent rights.

SUMMARY OF THE INVENTION

The primary objective of the invention herein is to provide a practical forged flange-type ball valve fabrication method for forging the left and right primary elements that are separated at the neck sections to comprise a one-piece flange-type ball valve or a two-piece flange-type ball valve, with the process including the direct forging of the water inlet seat and the ball valve seat for a one-piece flange-type ball valve the forging of the left primary element to form the initial blanks of the water inlet seat, the ball valve seat, and the forging of the right primary element to form the initial blanks of the position limiter seat and the water outlet seat, thereby enabling the fabrication of all the center through-holes and ball valve chamber in a single process without requiring the machining of the interior sections. Following this, all welding surfaces are brought flush and united utilizing friction welding methods to enable the welding of the water inlet seat to the ball valve seat of the one-piece flange-type valve as though the valve was fabricated entirely by forging and, furthermore, the welding together of the left and right primary elements of the two-piece flange-type ball valve to achieve the same forged fabricated appearance. All welding beads in the center through-holes are machined off utilizing a lathe to achieve a smooth surface in the center through-holes and the welding beads along the neck sections are removed during the surface finishing process, which thereby enables the saving of material costs and shortens the fabrication time, but retains the original strength of forging.

Another objective of the invention herein is to provide an emergency leakage structure, of which the bottom end of the ball valve seat in the said two-piece flange-type ball valve is machined into an inverted angle left sealing ring and the front end of the right primary element position limiter seat is machined into an inverted angle right sealing ring, such that when there is leakage of a hazardous gas or liquid, the bolts of left and right primary elements can be tightened to bring the left and right sealing rings into contact against the curved surface the ball valve seat as a temporary measure to stop the leakage until all liquid and gas content in the pipeline is expelled, at which time repair or replacement can be conducted. Furthermore, such a design prevents hazardous situations and reduces liquid and gas losses.

The fabrication method of the invention herein is further elaborated in the brief description of the drawings below which is followed by the detailed description of the invention herein.

BRIEF DESCRIPTION OF THE DRAWINGS

FIGS. 1A and 1B are cross-sectional views of a forged blank of a conventional two-piece flange-type ball valve that still requires finishing.

FIG. 1C is a cross-section view of a forged blank of a conventional one-piece flange-type ball valve that still requires finishing.

FIG. 1D is a cross-sectional view of a conventional one-piece flange-type ball valve after processing with a finished plug fitted into the exterior section.

FIGS. 2A–2D are cross-sectional views of the main component initial blanks of the two-piece flange-type ball valve of the invention herein.

DETAILED DESCRIPTION OF THE INVENTION

Figure 3:
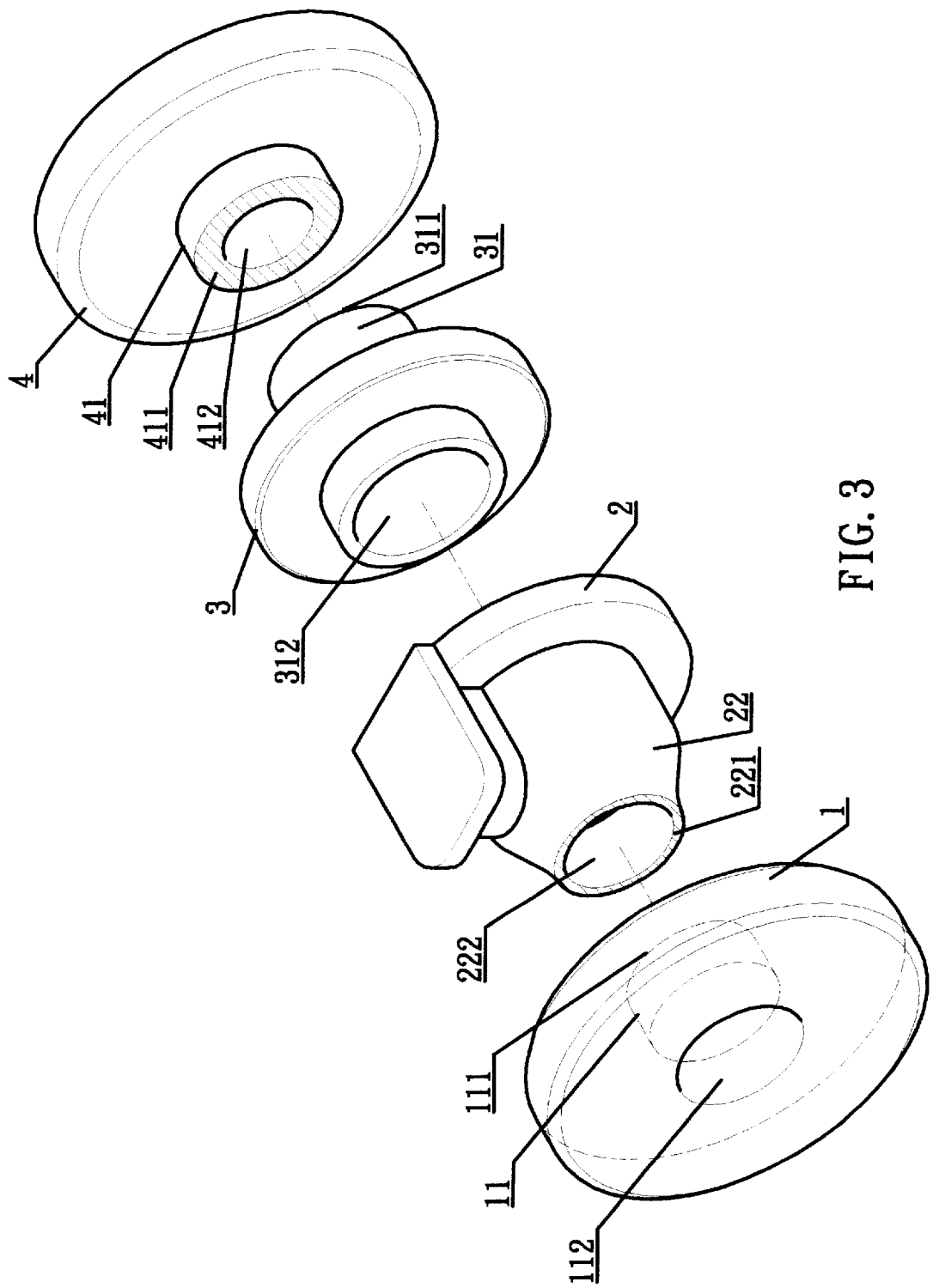
FIG. 3 is an exploded drawing of the main components of the two-piece flange-type ball valve of the invention herein before welding.
Figure 4:
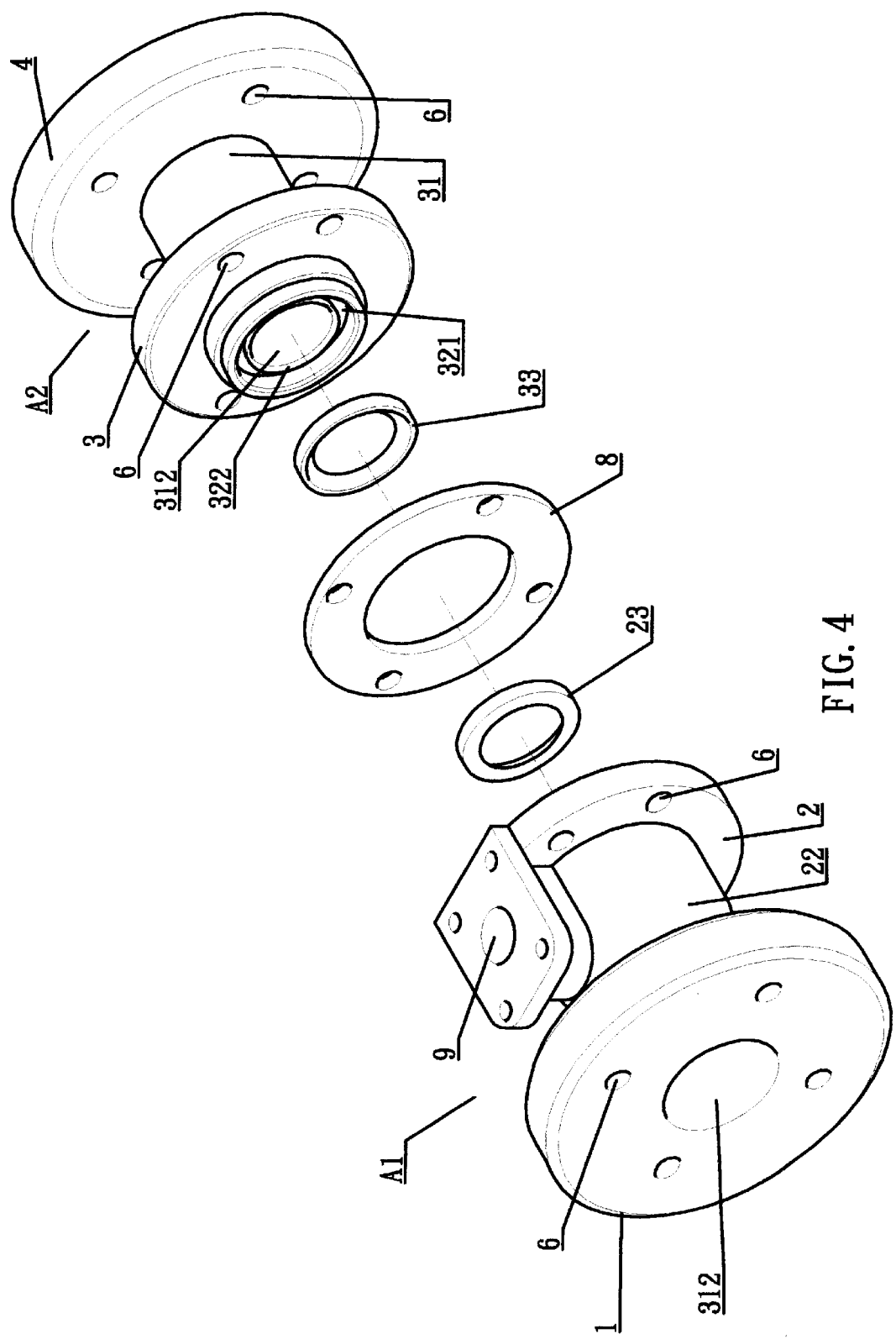
FIG. 4 is an exploded drawing of the two-piece flange-type ball valve of the invention herein after the friction welding finishing process.
Figure 5:
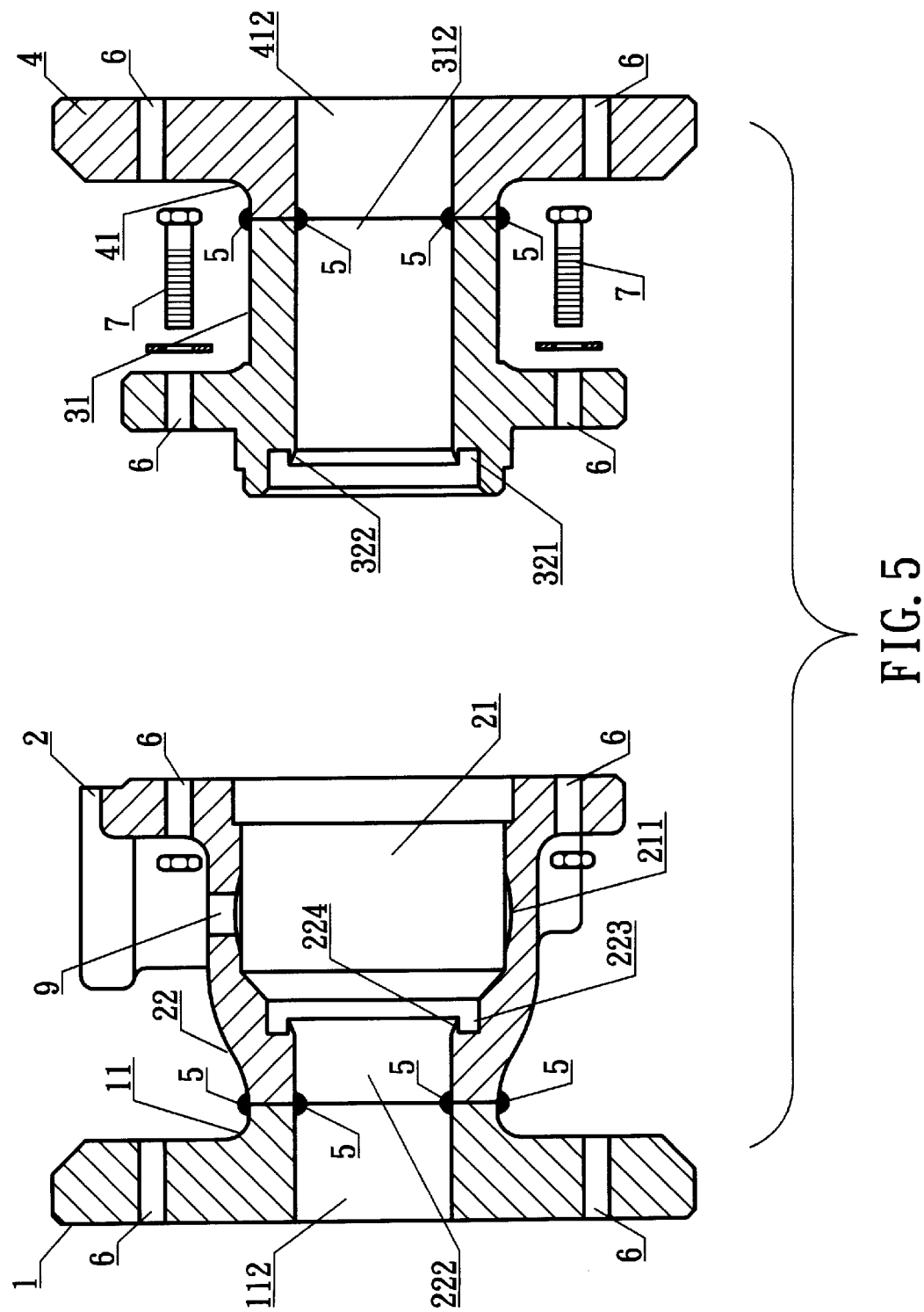
FIG. 5 is a cross-sectional drawing of the two-piece flange-type ball valve of the invention herein after the friction welding finishing process.
Figure 6:
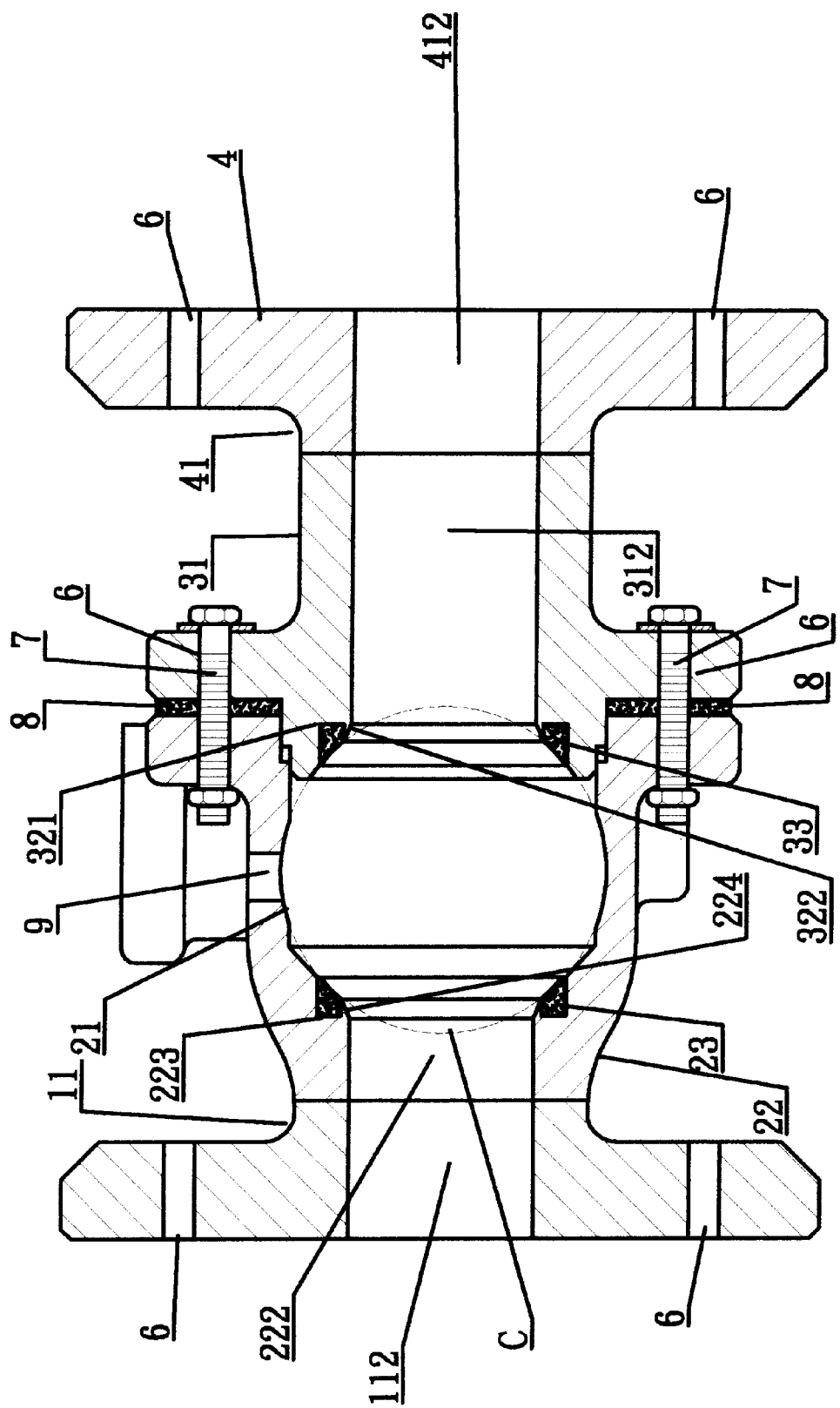
FIG. 6 is a cross-sectional drawing of the completely assembled two-piece flange-type ball valve of the invention herein.

The entire valve is comprised of the left and right primary elements, with the separation at the respective neck sections determined according to a reference blueprint and, furthermore fabricated from four forging dies which directly forge each of the four sections into Referring to FIGS. 2A–2D and FIG. 3, the four dies respectively forge the eight initial blanks of the water inlet seat 1, the ball valve seat 2, the position limiter seat 3, and the water outlet seat 4, and at the same time forms the center through-holes 112, 222, 312, and 412 as well as the friction welding surfaces 111, 221, 311, and 411 on the end surfaces of the neck sections 11, 22, 31, and 41, respectively. The friction welding surface walls around the center through-holes are of equal thickness to enable the union of the water inlet seat I to the ball valve seat 2 and the position limiter seat 3 to the water outlet seat 4 via the respective welding surfaces 111, 221, 311, and 411 utilizing a friction welding method, to thereby form the left and right primary elements A1 and A2 (as shown in FIG. 4). Referring to FIG. 3, FIG. 4, and FIG. 5, when the welding surface 111 of the water inlet seat 1 is friction welded to the welding surface 221 of the ball valve seat 2 and the welding surface 311 of the position limiter seat 3 is friction welded to the welding surface 411 of the water outlet seat 4 and thereby united into two single entities to form the left and right primary elements A1 and A2, the welding process produces a protruding bead 5 that also emerges from the exterior welding surfaces of the center though-holes and the neck sections. A chisel is utilized to remove the respective beads 5 along the interior of the center through-holes in the primary elements A1 and A2 to produce a smooth surface inside the center through-holes. During the exterior finishing, all the beads 5 protruding from the neck sections are removed to achieve an unblemished attractive appearance. Then, the ball valve chamber 21 of the ball valve seat 2 is fabricated along with a seat 211 matching the spherical profile of the ball valve C. After a groove 223 for inserting the sealing washer 23 is formed near the end of the ball valve seat 2 center though-hole 222, an inverted angle left sealing ring 224 is machined on the front end of the ball valve seat 2 center though-hole 222. Then, a right groove 321 for inserting the sealing washer 33 is formed at the front end of the position limiter seat center though-hole 312 of the right primary element A2. inverted angle sealing ring 322 is machined on the front end of the position limiter seat center though-hole 312. The water inlet seat 1, the ball valve seat 2, the position limiter seat 3, and the water outlet seat 4 are then drilled to form the respective mounting holes 6 and handle insertion hole 9 for installing the handle and the bolts 7 that fasten the gasket 8, which enables the positioning of the ball valve against the sealing washers 23 and 33 inside the ball valve chamber 21. This structure constitutes a forged and structurally integrated valve that in, addition to saving material costs and shortening fabrication time, also retains the original strength of the forged materials. Referring to FIG. 6, the left inverted angle sealing ring 224 inside the ball valve seat 2 and the right inverted angle sealing ring 322 of the position limiter seat 3 can be utilized when hazardous gas or liquid leakages occurs due to the aging and deterioration of the left and right sealing washers 23 and 33 by tightening the bolts 7 to increase the closure between the left and right primary elements A1 and A2 and cause the left and right inverted angle sealing ring 224 to directly press against the ball valve C, thereby allowing a temporary stoppage of the leaking and, after all liquid or gas has been completely expelled from the pipeline, the necessary replacement and repair can be conducted to avoid further hazards and reduce losses.

Figure 7:
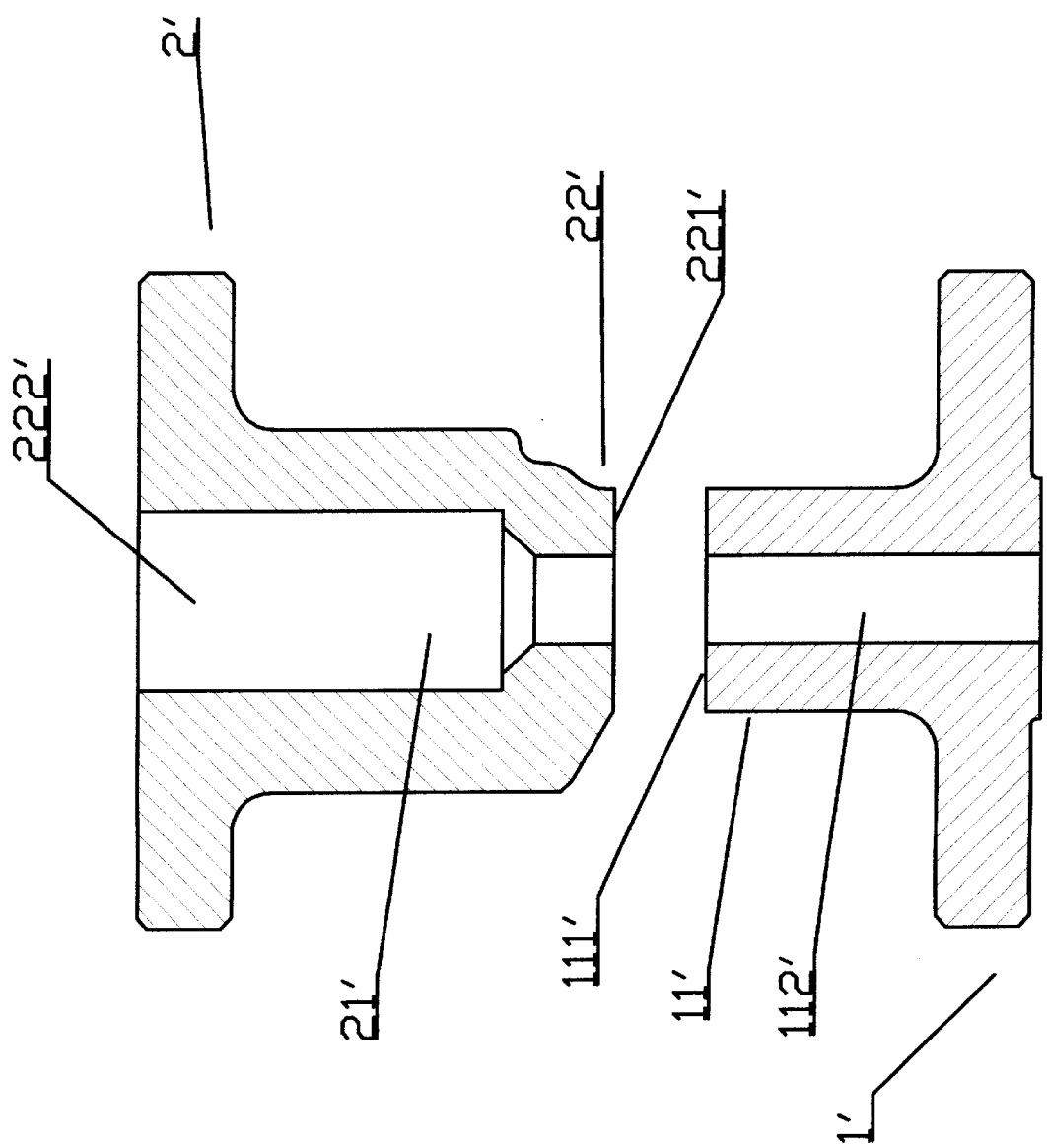
FIG. 7 is a cross-sectional drawing of the main component initial blanks of the one-piece flange-type ball valve of the invention herein.
Figure 8:
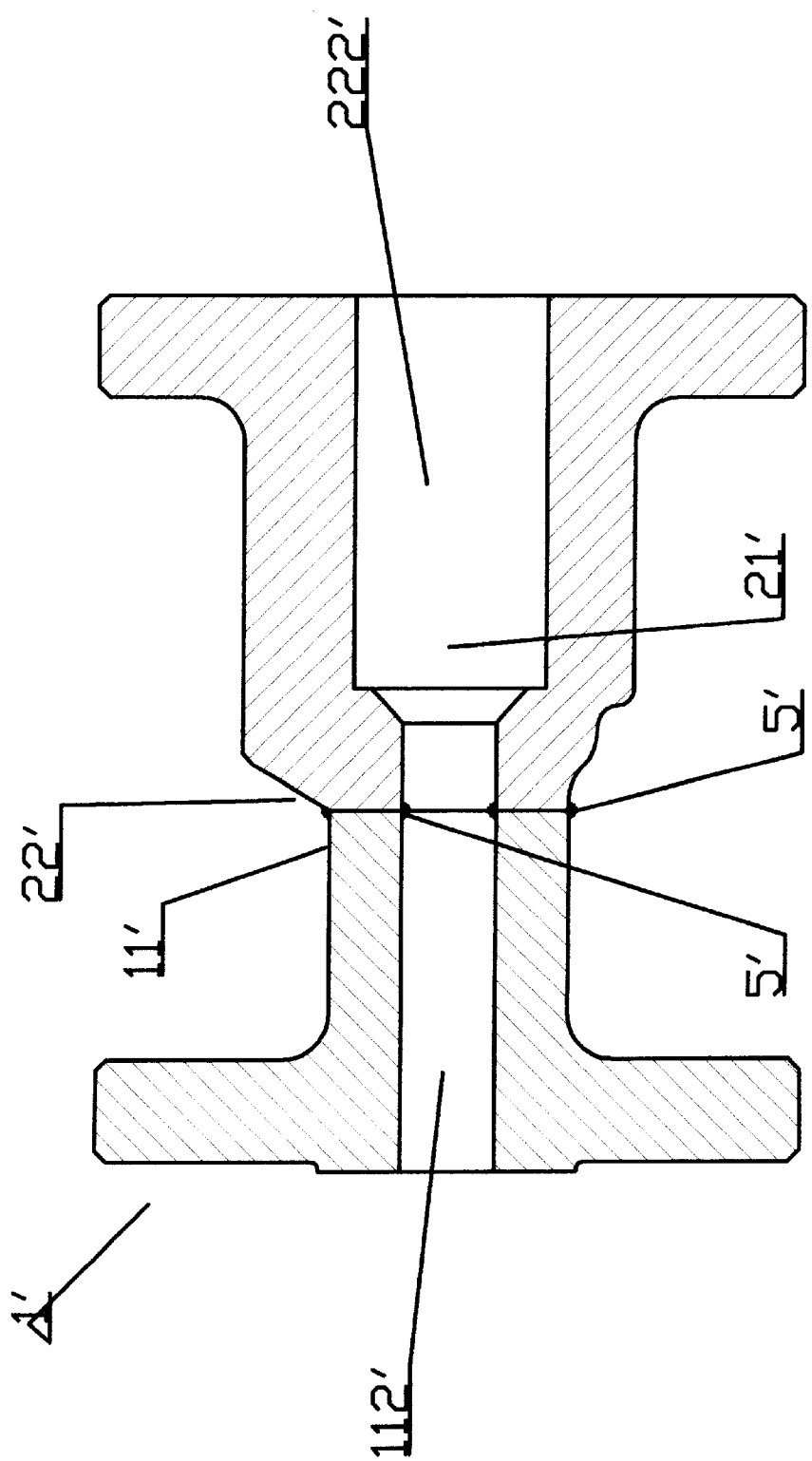
FIG. 8 is a cross-sectional drawing of the one-piece flange-type ball valve of the invention herein after the friction welding.
Figure 9:
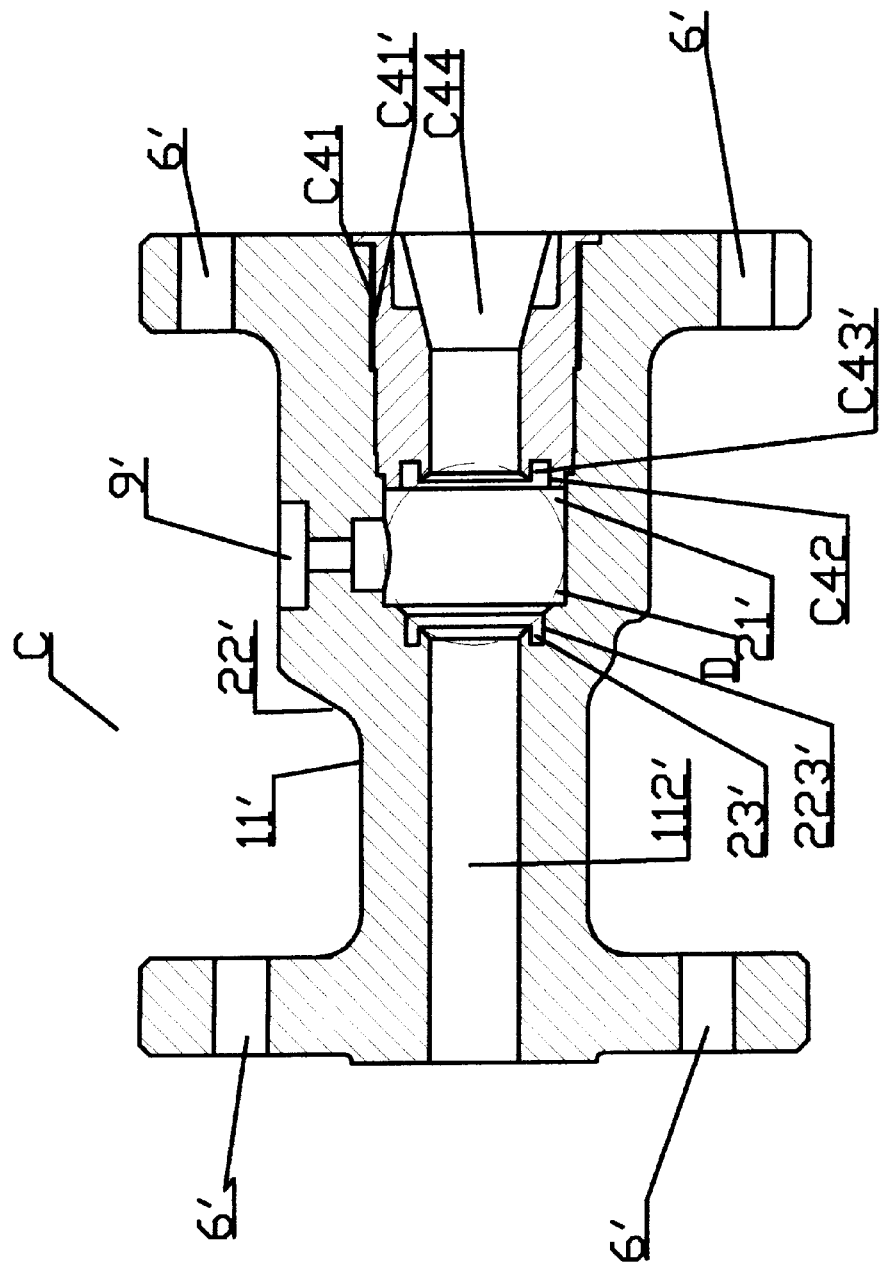
FIG. 9 is a cross-sectional drawing of the completely assembled one-piece flange-type ball valve of the invention herein following the finishing process.

Referring to FIG. 7, the water inlet seat neck section 11' is the point of separation utilized to forge a water inlet seat 1' and a ball valve seat 2' and, furthermore, with the center through-hole 112' of the water inlet seat 1', the center through-hole 222' of the ball valve seat 2', and the ball valve chamber 21' formed at the same time. Referring to FIG. 8, the welding surface 111' at the front end of the water inlet seat 1' and the welding surface 221 ' at the front surface of the ball valve seat 2' are of an identical thickness and, after being brought into a flush arrangement, a friction welding method is utilized to unite the water inlet seat 1' and the ball valve seat 2' into a single entity. The bead 5' protruding along the welded areas are removed with a chisel, and the bead 5' formed between the water inlet seat neck section 11' and the ball valve seat neck section 22' are removed during the surface finishing process to complete the production of a unitarily forged one-piece ball valve C. Referring to FIG. 9, a left groove 223', mounting holes 6', a handle mounting hole 9', and the internal threads C21' of the ball valve seat 2' center through-hole 222' are then later formed and, furthermore, the already finished plug C4' is inserted; having a right groove C42, a right through-hole C44, and external threads C41', the said plug C4' is inserted through the left and right sealing washers 23' and C43' seated in the left and right grooves 223' and C42 to complete the assembly of a one-piece flange-type ball valve that enables a saving of materials and reduces production time and, furthermore, is easy to fabricate.

In summation of the foregoing section, since the main components of the practical embodiment of the invention herein are forged, an effective solution is provided for the pitting and rough edge vestiges found on cast metal components. Furthermore, the vertically forged components can be completed using computer-controlled lathing and metal finishing processes to increase both production capacity and quality, while also reducing defect rates and production cost to thereby gain a larger market share.

What is claimed is:

1. A method of forming a flange type ball valve comprising the steps of:
    a) forging a fluid inlet seat having a first flange, a first center through hole and a first friction welding portion;
    b) forging a ball valve seat having a second flange, a second center through hole, a ball valve chamber, and a second friction welding portion such that a wall thickness of the second friction welding portion is equal to a wall thickness of the first friction welding portion;
    c) friction welding the ball valve seat and the fluid inlet seat together at the first and second friction welding portions so as to form a first sub-assembly;
    d) removing any protruding internal and external welding beads from the first sub-assembly;
    e) forging a position limiter seat with a third flange, a third center through hole and a third friction welding portion;
    f) forging a fluid outlet seat with a fourth flange, a fourth center through hole and a fourth friction welding portion, such that a wall thickness of the fourth friction welding portion is equal to a wall thickness of the third friction welding portion;
    g) friction welding the position limiter seat and the fluid outlet seat together at the third and fourth friction welding surfaces so as to form a second sub-assembly;
    h) removing any protruding internal and external welding beads from the second sub-assembly;
    i) forming a first sealing washer groove in the first sub-assembly adjacent to the ball valve chamber;
    j) forming a second sealing washer groove in an end of the second sub-assembly;
    k) forming mounting holes in the first, second, third and fourth flanges, the mounting holes in the second and third flanges being aligned with each other;
    l) forming a ball seat in the ball valve chamber;
    m) forming a handle insertion hole in the ball valve seat communicating with the ball valve chamber;
    n) inserting first and second sealing washers in the first and second sealing washer grooves;
    o) placing a ball valve in the ball valve chamber; and,
    p) attaching the first and second sub-assemblies by fastening elements passing through the mounting holes in the second and third flanges such that the first and second sealing washers contact the ball valve.

2. The method of forming a flange type ball valve of claim 1 comprising the further steps of:
    a) forming a first inverted angle sealing surface on the ball valve seat adjacent to the first sealing washer groove; and,
    b) forming a second inverted angle sealing surface on the position limiter seat adjacent to the second sealing washer groove.

* * * * *